United States Patent
Hoffmann

(10) Patent No.: US 9,261,428 B2
(45) Date of Patent: Feb. 16, 2016

(54) METHOD FOR CALIBRATING AT LEAST ONE HEADLAMP

(71) Applicant: HELLA KGaA Hueck & Co., Lippstadt (DE)

(72) Inventor: Ingo Hoffmann, Berlin (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 32 days.

(21) Appl. No.: 14/173,164

(22) Filed: Feb. 5, 2014

(65) Prior Publication Data

US 2014/0217888 A1    Aug. 7, 2014

(30) Foreign Application Priority Data

Feb. 5, 2013    (DE) .................. 10 2013 201 876

(51) Int. Cl.
*B60Q 1/00* (2006.01)
*G01M 11/06* (2006.01)

(52) U.S. Cl.
CPC .......... *G01M 11/064* (2013.01); *G01M 11/068* (2013.01)

(58) Field of Classification Search
CPC .................. B60Q 1/1423; B60Q 1/143; B60Q 2300/132; B60Q 2300/134; B60Q 2300/314; B60Q 2300/33221
USPC ................. 362/464–466, 475, 507, 487, 525; 315/82
See application file for complete search history.

(56) References Cited

U.S. PATENT DOCUMENTS

| 7,429,120 B2* | 9/2008 | Sugimoto | 362/466 |
| 2010/0165102 A1* | 7/2010 | Klebanov et al. | 348/135 |
| 2011/0261574 A1* | 10/2011 | Koppermann | 362/465 |
| 2013/0286672 A1* | 10/2013 | Godecker et al. | 362/466 |

FOREIGN PATENT DOCUMENTS

DE    10 2010 046 517 A1    4/2011

OTHER PUBLICATIONS

German Search Report, Application No. DE 10 2013 201 876.2, Oct. 1, 2013, 5 pgs.

* cited by examiner

*Primary Examiner* — Haissa Philogene
(74) *Attorney, Agent, or Firm* — Paul D. Strain, Esq.; Strain & Strain PLLC

(57) ABSTRACT

The invention relates to a method for calibrating at least one headlamp (2, 3) and/or at least one element of a headlamp, particularly on a motor vehicle (1), using the illumination structure that is contained in the light distribution of the headlamp or of the element of the headlamp, with an image data acquisition unit (6) and a control unit (7), wherein the illumination structure of at least one headlamp (2, 3) and/or of at least one element of a headlamp is formed between a dark area (9) and a light area (10), such as a dark/light boundary, and the image data acquisition unit (6) detects an, in particular retro-reflective, object (13) when changing from the dark area (9) to the light area (10), wherein also the absolute position of the object (13) upon entry into the light area (10) is determined and this is used to determine an actual setting of the at least one headlamp (2, 3) or of the at least one element of a headlamp. The invention also relates to an apparatus in this regard.

21 Claims, 4 Drawing Sheets

METHOD FOR CALIBRATING AT LEAST ONE HEADLAMP

CROSS-REFERENCE TO RELATED PATENT APPLICATIONS

This application is based upon and claims the benefit of priority from prior German Patent Application No. 10 2013 201 876.2, filed Feb. 5, 2013, the entire contents of which are incorporated herein by reference in their entirety.

TECHNICAL FIELD

The invention relates to a method for calibrating at least one headlamp and/or at least one element of a headlamp, particularly on a motor vehicle, particularly in a headlamp system on a motor vehicle. The invention also relates to an apparatus in this regard.

PRIOR ART

In motor vehicles, the calibration of at least one headlamp and/or of at least one element of a headlamp is of particular importance, since the first incorrect adjustment to the at least one headlamp and/or to at least one element of a headlamp results in adverse or inadvertent lighting of the road.

A headlamp may preferably have an element that has an illuminant and that is used to illuminate an area in front of a motor vehicle, for example. Alternatively, the headlamp may also have a plurality of elements that have an illuminant. In this case, the headlamp can be calibrated as such and/or the at least one element of the headlamp can be calibrated. In the case of a plurality of elements of the headlamp, the elements can be calibrated individually or in groups or all elements can be calibrated together.

In this case, the at least one headlamp may be provided on its own or in pairs or may be in the form of a headlamp system comprising at least one headlamp or comprising a plurality of headlamps. In this case, a headlamp system may be in the form of a headlamp front formed from at least one headlamp or may be equipped from at least one right-hand and one left-hand headlamp, each having at least one element of a headlamp.

In this case, elements of the headlamp are intended to be understood to mean components of the headlamp that have illuminants and are used to light preferably predefined regions. By way of example, the illuminants used may be LED illuminants with or without an optical system.

In the case of erroneous calibration that results in excessively high adjustment of the headlamp or the headlamps or of the element(s) of a headlamp, for example, other road users, for example from the oncoming traffic, may be dazzled, so that a dangerous traffic situation might arise as a result. In the case of other incorrect adjustment of headlamps, it may also occur that the headlamps are adjusted too low, so that too little light is directed onto the road, as a result of which the lighting situation is rather unfavorable for the driver of the vehicle.

Headlamps or elements of headlamps or headlamp systems also have life cycle effects and setting processes taking place in the long term, as a result of which the situation of the at least one headlamp and/or elements of a headlamp and the direction of radiation of the emitted light can vary. In addition, aging effects in the components of a headlamp or a headlamp system are also possible, which can result in a change in the adjustment of the headlamp or of the headlamp system.

Similarly, short-term effects and setting processes are known. For example, thermal effects in the first few minutes of operation after the headlamp is switched on are known that can result in a change in the adjustment of the at least one headlamp or of elements of a headlamp.

In the case of new driver assistance systems, not only good object recognition but also the precise adjustment of the headlamps is a prerequisite for good and reliable operation of the assistance systems so that, by way of example, the components of the headlamps or of a headlamp system can be adjusted such that the illumination structures formed, such as light/dark boundaries, can be guided such that maximum illumination up to close to the areas that need to be masked is made possible in order to achieve good illumination of the road and of adjacent areas and nevertheless not to dazzle the oncoming traffic and possibly other objects recognized as objects that must not be dazzled.

Therefore, the headlamps of a motor vehicle are adjusted at the end of production and, at least in some cases, a check on the components of headlamps is offered or performed in workshops. By way of example, this involves at least one headlamp being switched on in front of a calibration wall or corresponding measuring apparatuses and the at least one headlamp being adjusted as appropriate such that the adjustment corresponds to the target adjustment. These adjustments and calibrations are ineffective in the case of changes and effects that ensue in the short term, however, because they cannot track the changes that ensue in the short term.

Alternatively, calibrations methods are known in which the light distribution on the road is measured and is compared with a target distribution. In this case, however, it is not always possible to perform the measurement or the comparison precisely enough if a light distribution is indistinct. Disturbing effects can also result in the measurement of the light distribution being impaired. Methods are also known that project separate calibration marks in the visible or infrared range onto the road, the position of said marks being measured by an independent measuring device on the vehicle, preferably a camera, and calibration information being able to be obtained therefrom. These methods require design changes to the headlamp and in some cases even an additional light source and a dedicated exclusive measuring device, which means that additional costs arise as a result, which are rather undesirable. Furthermore, it is necessary to ensure that a change in the situation of the calibration marks corresponds to a change in the situation of the headlamp light distribution for all ambient conditions over the entire lifetime, which involves a very high level of design complexity.

ILLUSTRATION OF THE INVENTION, OBJECT, ACHIEVEMENT OF THE OBJECT, ADVANTAGES

It is therefore the object of the present invention to provide a method and an apparatus for calibrating at least one headlamp or at least one element of a headlamp that can be used to perform reliable and more precise calibration of the adjustment of the at least one headlamp or the at least one element of a headlamp, that can also take into account effects that arise in the short term and that is nevertheless of simple design.

The object of the present invention in respect of the method for calibration is achieved by means of the features according to Claim 1.

An exemplary embodiment of the invention relates to a method for calibrating at least one headlamp and/or at least one element of a headlamp, particularly on a motor vehicle, using the illumination structure that is contained in the light distribution of the headlamp or of an element of a headlamp, with an image data acquisition unit and a control unit, wherein the illumination structure of the at least one headlamp and/or of the at least one element of a headlamp is formed between a dark area and a light area, such as a light/ dark boundary, and the image data acquisition unit detects an, in particular retro-reflective, object when changing from the dark area to the light area, wherein also the absolute position of the object upon entry into the light area is determined and this is used to determine an actual setting of the at least one headlamp and/or of the at least one element of a headlamp.

This allows the adjustment of the headlamp or of the headlamps and/or of the at least one element of a headlamp to be calibrated even while traveling. The calibration can also be performed repeatedly in this case. Accordingly, it is possible to influence both long-term and short-term changes to the adjustment.

In this case, it is expedient if at least two headlamps or elements of a headlamp or of two headlamps are provided, wherein the respective actual setting of the two headlamps or of the two elements of the headlamps is determined. This allows individual ascertainment of the actual setting and appropriate individual calibration of each headlamp to be performed. In addition, it is expedient if the actual setting of one element of a headlamp is determined independently of the actual setting of a further element of a headlamp. This allows appropriate individual calibration of each element of a headlamp to be performed.

It is also expedient if one or more independent illumination structures, such as light/dark boundaries, are produced by the headlamp(s) or the element(s) of at least one headlamp and have their actual setting determined.

In this case, it is advantageous if a comparison of the actual setting of the at least one headlamp or of the element of a headlamp with a target setting for the at least one headlamp is used to produce a signal for actuating a control element for adjusting the at least one headlamp or the element of the headlamp.

It is also advantageous if the adjustment of the at least one headlamp or of the element of the headlamp is made using the correspondingly determined actual setting of the respective headlamp or of the element of the headlamp.

In this case, it is also advantageous if the adjustment is made on the basis of the discrepancy between an actual value and a target value.

A headlamp system may comprise a multiplicity of components that can form illumination structures such as light/ dark boundaries. The components may have a fixed geometrical relationship with respect to one another or intentionally or unintentionally move independently of one another. In this respect, not only the headlamp system as a whole may require calibration and be capable of calibration, but the components of said headlamp system may also require calibration and be capable of calibration. In this context, components include headlamps or elements of headlamps, for example. Provided that the individual light/dark boundary of the component results in a grayscale value jump for a reflector in an expected spatial area even when there is an overlap with other light distributions from other components, the calibration of these components is also the subject matter of the present invention. In this case, LED headlamps are also regarded as such systems, said LED headlamps comprising a plurality of LEDs or LEDs with optical systems. By way of example, LED headlamps may have with 3, 4 or 5 to 16 or more LEDs/optical systems per side of the vehicle.

In addition, it is expedient if the image data acquisition unit is a stereo camera or a mono camera. This allows the change of brightness to be sensed or used in order to recognize the object. When retro-reflectors, such as cat's eyes or the like, are used, a change from a dimly lit area to a very brightly lit area is made, so that the object undergoes a change of brightness by several orders of magnitude.

It is also expedient if the position of the object is ascertained by means of a position recognition unit, such as a radar apparatus, a lidar apparatus, a stereo camera and/or a mono camera. It is thus possible to determine the position of the object at the time of entry into the light area.

Alternatively, the position data can also be transmitted from outside, for example by another control unit. This can be effected by said object or by another object, another vehicle or a control center.

It is also advantageous if the image data acquisition unit and the position recognition unit is the same unit, such as a stereo camera or a mono camera.

It may also be advantageous if the object is an object with known position data, wherein the position of the vehicle can be ascertained by means of map data and/or position data, such as GPS position data. If the position data and the position of the vehicle with the orientation thereof with respect to the world coordinate system are known, this can be used to compare the expected transfer to the light area with the actual observation of said transfer, and this can be used to ascertain the adjustment of the headlamps. Alternatively, the position can also be transmitted or may also be known.

In addition, it is expedient if the position of the object at the time of entry into the light area and/or thereafter is ascertained by virtue of the position of said object after entry into the light area being tracked and thereby determined more precisely and the position upon entry into the light area being calculated back. In this case, it is possible to determine a position or else a sequence of positions in order to determine the position at the time of entry into the light area.

Knowledge of the 3D position of the object at the time at which the light/dark boundary is crossed is particularly expedient in order to determine the object angle from the headlamp position and to take it into account for determining a correction angle. By way of example this can be accomplished on the basis of the object angle from camera position, which object angle can be ascertained using the 3D position from camera perspective, for example.

In this case, it may be expedient if knowledge of a position or 3D position of the object at the time at which the light/dark boundary is crossed is used in order to determine an angle difference between the object angle from the camera position and the object angle from the headlamp position, this angle difference being taken into account for determining a correction angle for the headlamp or for the element of a headlamp.

It is also expedient if the position of the object after entry into the light area is determined repeatedly or continuously and the position upon entry into the light area is calculated back therefrom. Accordingly, it is also possible to determine a sequence of positions. The sequence ascertained thereby can be used to ascertain a movement profile for the object, and the movement profile can be used to infer the position at the time of entry into the light area.

It is also expedient if the vehicle movement is taken into account for determining the position of the object at the time of entry into the light area and possibly thereafter.

In addition, it is expedient if the illumination structure can be broken down into horizontal and vertical components that can be considered independently of one another, since in this way the pitch and/or yaw angle of the current orientation of the at least one headlamp and/or of the at least one element or of a component can be determined. By way of example, it is advantageous if a light/dark boundary is a horizontal light/dark boundary or a vertical light/dark boundary. It is also possible for the method to be performed successively for the vertical illumination structure and then for the horizontal illumination structure, for example light/dark boundary, or vice versa. The selection of the illumination structure, such as the light/dark boundary, may also be dependent on the determination of the object, since the object itself decides which illumination structure, for example light/dark boundary, it crosses.

In this case, it is expedient if the vertical illumination structure, such as a vertical light/dark boundary, is used to calibrate the yaw angle and/or the horizontal illumination structure, such as a horizontal light/dark boundary, is used to calibrate the pitch angle.

In this case, it is particularly expedient if knowledge of a position or 3D position of the object at the time at which the illumination structure, such as the light/dark boundary, is crossed is used in order to determine an angle difference between the object angle from the camera position and the object angle from the headlamp position, this angle difference being taken into account for determining a correction angle for the at least one headlamp and/or the at least one element of a headlamp. This means that the at least one headlamp or the at least one element of a headlamp is also calibrated by taking into account the angle error between the camera and the headlamp or the element of a headlamp. This allows the camera to be positioned arbitrarily relative to the headlamp or to the element of the headlamp. The resultant error is taken into account in the calibration.

In this case, it is advantageous if the calibration is performed after the ascertainment of the actual value of the adjustment and after determination of the discrepancy from a target value. This allows direct calibration to take place.

Alternatively, it is also advantageous if after the ascertainment of the actual value of the adjustment and after determination of the discrepancy from a target value the discrepancy is stored in a memory, wherein a multiplicity of ascertainment operations and storage operations for discrepancy data are performed, with editing or averaging of the stored discrepancy data being performed, which is used for the calibration. Such editing may be averaging and/or smoothing and/or filtering, for example. It is also possible for the adjustment data from other components to be taken into account in this case.

In addition, it is particularly expedient if the necessary calibration is rated, and a signal, particularly for warning a driver or informing a driver, can be output when necessary calibration is above a prescribable limit value. This allows a warning to be output for calibration with a relatively large adjustment to be made, so that the driver can be made aware thereof and can possibly drive to a workshop or a service facility.

The object of the present invention in respect of the apparatus for calibration is achieved by means of the features according to Claim 20.

An exemplary embodiment of the invention relates to an apparatus for performing the method having at least one headlamp or having at least one element of a headlamp, an image data acquisition unit, a position recognition unit and a control unit, wherein the image data acquisition unit is provided in order to recognize an object when changing from a dark area to a light area of a headlamp light distribution, the position recognition unit is provided in order to ascertain the position of the object upon entry into the light area and to use the position of the object to determine the illumination structure, such as a light/dark boundary, in order to be able to use the actual setting of the at least one headlamp or at least one element of a headlamp in comparison with a target setting of the headlamp or of the element to make a correction to the adjustment.

In this case, it is expedient if the adjustment of the at least one headlamp and/or the at least one element is made by means of at least one control element in order to alter the at least one headlamp or the at least one element by a yaw angle and/or a pitch angle. Alternatively, the illumination structure, such as the light/dark boundary, can be changed, for example displaced, by means of the activation/deactivation or dimming of light-emitting elements of the headlamp system or by means of free shaping of the light beam. Alternatively, the illumination structure can be changed, for example the light/dark boundary can be displaced, by means of the activation/deactivation or dimming of light-emitting elements of the headlamp system or free shaping of the light beam.

Advantageous developments of the present invention are described in the subclaims and in the description of the figures below.

BRIEF DESCRIPTION OF THE DRAWINGS

The invention is explained in detail below using an exemplary embodiment with reference to a drawing, in which.

PREFERRED EMBODIMENT OF THE INVENTION

Figure 1:
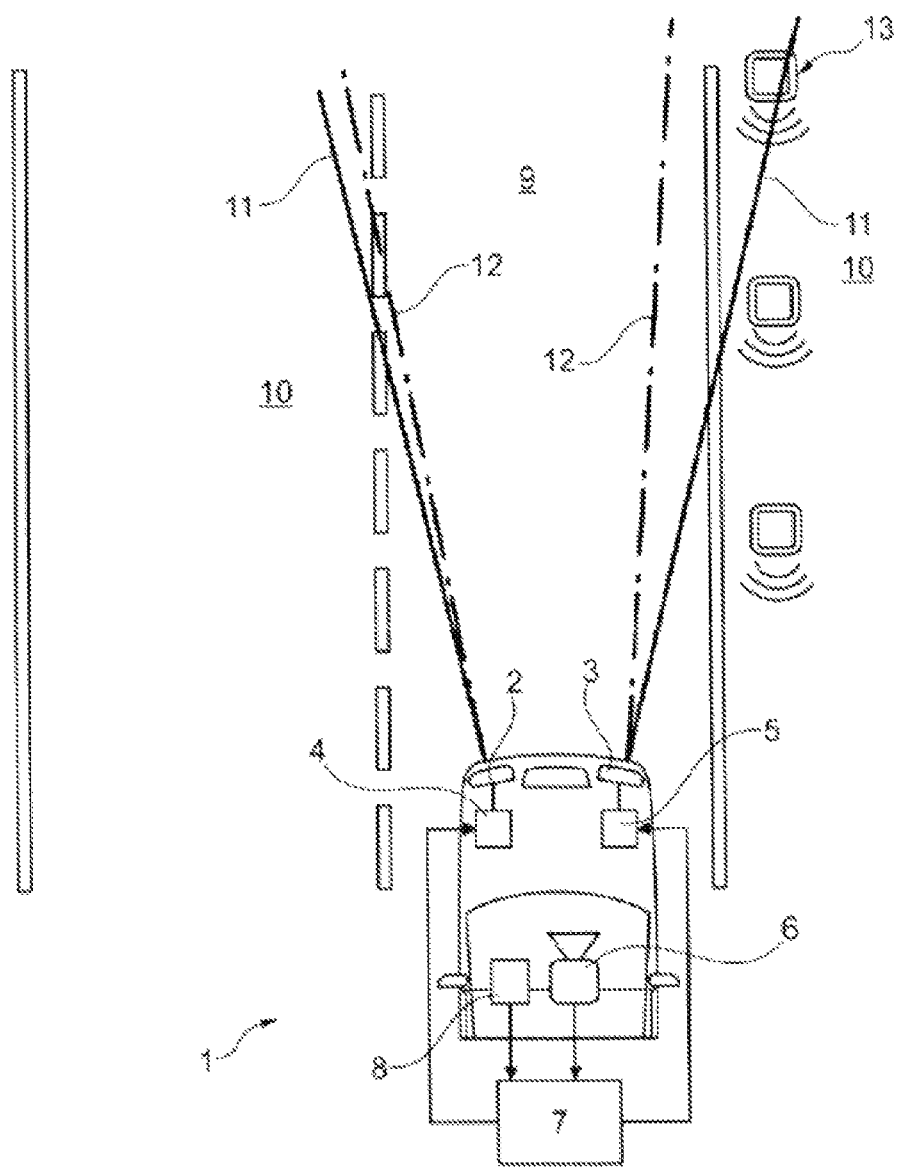
FIG. 1 shows a schematic illustration of a vehicle in a road traffic situation.

FIG. 1 shows a vehicle 1 having headlamps 2, 3 and control elements 4, 5 that can be used to adjust the headlamps 2, 3. Elements of headlamps that can be altered by means of control elements are also covered by the invention. Headlamp systems having at least one headlamp or having a plurality of headlamps and/or having a plurality of elements of a headlamp are also covered by the invention.

When a headlamp is described below, this is also simultaneously meant to cover the consideration of elements of headlamps in corresponding fashion without the need for further separate mention. By way of example, such elements of headlamps may be separately adjustable light sources that are each designed to be individually adjustable, so that the adjustment of the respective light source can be calibrated. By way of example, such light sources may be LED light sources with and without an associated optical system. In one inventive embodiment, a headlamp system may also comprise just one headlamp front. In this case, the headlamp front advantageously extends transversely over the front area of the motor vehicle.

In addition, the vehicle 1 has an image data acquisition unit 6 for acquiring image data, particularly in front of the vehicle, and also a control unit 7, which takes the data from the image data acquisition unit 6 as a basis for actuating the control elements 4, 5 for adjusting the headlamps 2, 3. In addition, a position recognition unit 8 is provided for recognizing positions of objects.

The headlamps 2, 3 produce a cone of light that has a dark area 9 and a light area 10. The light area 10 is separated from the dark area 9, that is to say an area having recognizably decreased lighting intensity, by the illumination structure, such as the light/dark boundary 11, that is to say an area having recognizably increased lighting intensity. In this case, an illumination structure may be a change in the brightness gradient or may be a structure pertaining thereto. There may thus be a small gradient on one side of the illumination structure, while said gradient changes and increases on the illumination structure, so that a visually recognizable structure for the brightness is obtained.

By way of example, an incorrect setting for the headlamps 2, 3 adversely affects the vertical light/dark boundary 11 on the right-hand side in the direction of travel and on the left-hand side in the direction of travel, it being necessary in each case to distinguish between an actual light/dark boundary 11 and a target light/dark boundary 12. The target light/dark boundary 12 is the light/dark boundary that is intended to be achieved by adjusting the headlamps 2, 3 in order to achieve optimum dazzle reduction for the oncoming traffic. If the headlamp(s) 2, 3 has/have its/their adjustment altered on account of different effects, this also results in an actual light/dark boundary 11 that differs from the target light/dark boundary 12.

The inventive method for calibrating headlamps 2, 3 provides an image data acquisition unit 6 and a control unit 7, wherein at least one headlamp 2, 3 produces a light/dark boundary 11 between a dark area 9 and a light area 10, and the image data acquisition unit 6 detects an object 13 when changing from a dark area 9 to a light area 10. If the object 13 is a reflector or an object that has a reflector, such as a retro-reflective element, in particular, then the brightness increases from the dark area to the light area by several orders of magnitude, which can be picked up and evaluated by the image data acquisition unit 6. By way of example, the object used may be a marker post with reflective elements, such as cat's eyes. The image data acquisition unit 6 detects the increase in the brightness of the object 13 or the object with increasing or increased brightness. In addition, the 3D position of the object 13 upon entry into the light area 10 is determined and this is used, with knowledge of the angle difference from the camera position and the headlamp position, to ascertain the light/dark boundary 11 and this is used to ascertain an actual adjustment for the at least one headlamp 2, 3 that prompts the light/dark boundary to have been crossed. Since the target adjustment is known, it can be used to ascertain the alteration to be performed for the headlamps.

On the basis of the actual adjustment of the headlamp 2, 3, it is possible for the control unit 7 to produce a signal in comparison with a known target adjustment for the headlamp 2, 3 in order to actuate a control element 4, 5 for adjusting the headlamp 2, 3.

By way of example, the position of the object 13 can be implemented by means of the position recognition unit, such as by means of a radar apparatus, a lidar apparatus, a stereo camera and/or a mono camera.

Alternatively, it is also possible to use an object 13 whose position is known because the GPS data for this object 13 are known.

The image data acquisition unit 6 is advantageously likewise a stereo camera or a mono camera that ascertains image data from in front of the vehicle.

The ascertainment of the position of the object 13 at the time of entry into the light area 10 can also be effected and made more precise by virtue of the object 13 and the position of the object 13 after entry into the light area 10 continuing to be observed and ascertained, the position of the object 13 at the time of entry into the light area 10 being able to be calculated back from the progressive or sequential ascertainment of the position of the object 13 and of the known inherent movement of the position recognition unit or of the vehicle carrying it.

Figure 2:
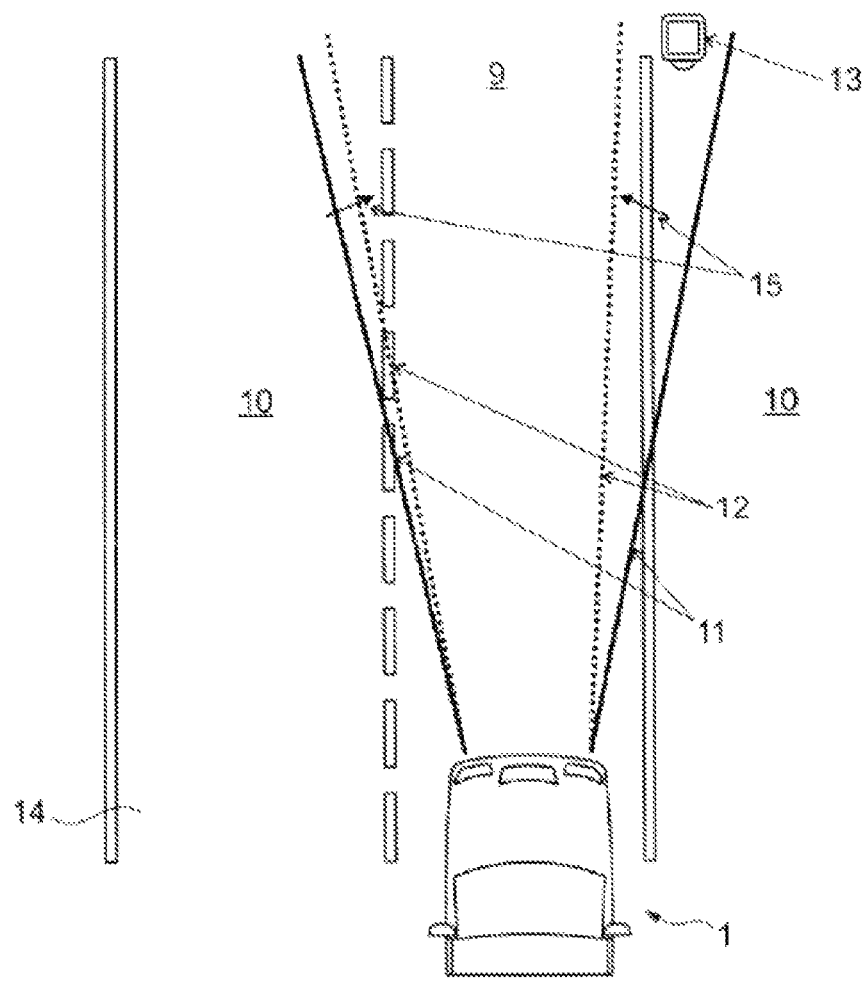
FIG. 2 shows a schematic illustration of a vehicle with an actual light/dark boundary and a target light/dark boundary.

FIG. 2 schematically shows the vehicle 1 in a road traffic situation on a road 14, wherein the actual light/dark boundary 11 deviates from the target light/dark boundary 12. The difference between the actual light/dark boundary 11 and the target light/dark boundary 12 corresponds to the calibration error or adjustment error 15, which is denoted by the arrows. This discrepancy needs to be corrected with an alteration.

In the exemplary embodiment in FIG. 2, the situation of the actual light/dark boundary 11 corresponds to the actual lateral angle of the light distribution, the target light/dark boundary 12 corresponding to the required lateral angle of the light distribution, that is to say to the target angle of the light distribution.

Figure 3:
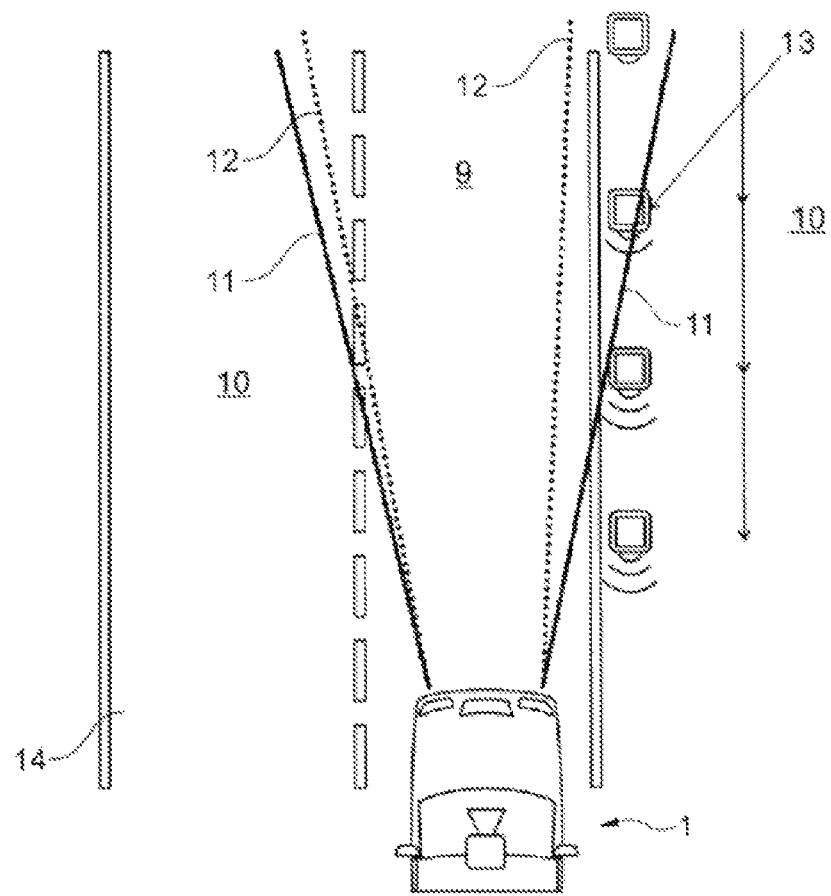
FIG. 3 shows a schematic illustration of a vehicle with an actual light/dark boundary and an object upon entry into the light area.
Figure 4:
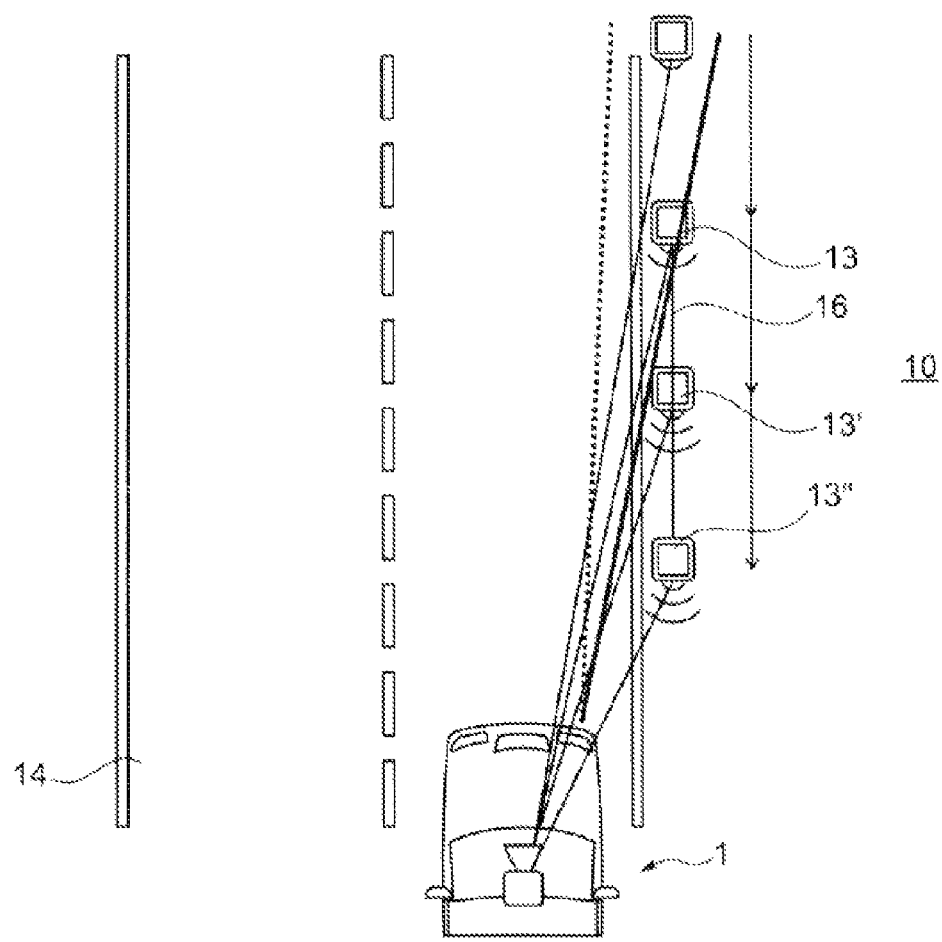
FIG. 4 shows a schematic illustration of a vehicle with an actual light/dark boundary and illustration of the ascertainment of the position of the object from a sequence of positions.

In addition, an object 13 having a reflector, for example, is shown, said reflector still being arranged in the dark area 9 in the example in FIG. 2. When the vehicle proceeds from a position in FIG. 2, the object 13 enters the light area 10 in FIG. 3, so that the object 13 is distinctly recognizable following this entry of the object 13 into the light area 10. As the vehicle proceeds, the position of the object 13 at different times can be ascertained, for example the object 13' at time t' and the object 13" at time t", with the ascertainment of the positions, such as the 3D positions of the objects 13' and 13", that is to say the object 13 at different times, and the known inherent movement of the position recognition unit being able to be taken as a basis for performing a back-calculation 16 in order to determine the position of the object 13 at the time of entry into the light area 10, that is to say at the light/dark boundary, in this regard see FIG. 4.

In this case, with a relatively large number of position determination operations for the object 13 at times after entry into the light area 10, it is possible to perform refined determination of the position of the object 13 upon entry into the light area 10.

It may also be particularly advantageous if the headlamps or the elements of a headlamp are adjusted such that, when calibration essentially cannot be performed instantaneously, the lighting range is adjusted with a relatively great tolerance in respect of the maximum lighting range so that other road users, such as the oncoming traffic, are not unnecessarily dazzled, whereas, when calibration can essentially be performed instantaneously, the tolerance can be chosen to be lower.

According to the invention, the desired type of light pattern defines the embodiment and situation of the illumination structure or of the illumination structures at the measurement time. Similarly, the target position of the illumination structures, such as the light/dark boundaries, of the elements of the headlamps, such as the target adjustment of the headlamp, or of the components of the headlamps can be determined therefrom or provided by the headlamp controller.

If the invention involves an, in particular retro-reflective, object being detected by the image acquisition unit when changing from a dark area to a light area, the position of the object at the time of the change can be used, or further changes by objects can be used, to ascertain the situation of the illumination structure. The actual position of the illumination structure can then again be used to infer the actual adjustment of the headlamp or of the elements of the headlamps.

The differences between target position and actual position of the illumination structure and/or the differences between target adjustment and actual adjustment of the headlamp or of the elements of the headlamp can be used to infer the calibration error for the headlamp and/or for the elements of the headlamp.

LIST OF REFERENCE SYMBOLS

1 Vehicle
2 Headlamp
3 Headlamp
4 Control element
5 Control element
6 Image data acquisition unit
7 Control unit
8 Position recognition unit
9 Dark area
10 Light area
11 Light/dark boundary
12 Target value for the light/dark boundary
13 Object
14 Road
15 Calibration error
16 Back-calculation

The invention claimed is:

1. A method for calibrating at least one headlamp or at least one illumination element of the at least one headlamp, the method comprising:
providing at least one headlamp comprising at least one illumination element, wherein the at least one headlamp or the at least one illumination element produces a light distribution comprising an illumination structure,
providing an image data acquisition unit and a control unit,
detecting the illumination structure with the image data acquisition unit and the control unit, wherein the illumination structure is formed between a dark area and a light area and the image data acquisition unit detects an object when changing from the dark area to the light area,
determining an absolute position of the object upon entry into the light area and using said absolute position to determine an actual setting of the at least one headlamp or of the at least one illumination element, and
calibrating the at least one headlamp or the at least one illumination element after determining a discrepancy between the actual setting and a target setting.

2. The method according to claim 1, further comprising providing at least two headlamps or at least two illumination elements and determining the respective actual setting of the at least two headlamps or of the at least two illumination elements.

3. The method according to claim 1, wherein one or more independent illumination structures are produced by the at least one headlamp or the at least one illumination element that is used for determining the actual setting.

4. The method according to claim 1, further comprising producing a signal for actuating the at least one headlamp or the at least one illumination element by comparing the actual setting of the at least one headlamp or of the at least one illumination element with the target setting for the at least one headlamp or for the at least one illumination element.

5. The method according to claim 1, further comprising adjusting the at least one headlamp or the at least one illumination element by using the actual setting of the at least one headlamp or of the at least one illumination element.

6. The method according to claim 5, wherein the adjustment is made on the basis of a discrepancy between the actual setting and the target setting.

7. The method according to claim 1, wherein the image data acquisition unit is a stereo camera or a mono camera.

8. The method according to claim 1, wherein the position of the object is ascertained using a position recognition unit.

9. The method according to claim 1, wherein the image data acquisition unit and the position recognition unit are the same unit.

10. The method according to claim 1, wherein the object is an object with known position data, wherein the position of the vehicle can be ascertained by using map data or position data.

11. The method according to claim 1, further comprising calculating the position of the object at the time the object enters into the light area by using the position of said object after the object enters into the light area.

12. The method according to claim 1, wherein the position of the object after the object enters into the light area is determined repeatedly or continuously and the position upon the object entering into the light area is calculated back therefrom.

13. The method according to claim 1, wherein a vehicle movement is taken into account for determining the position of the object at the time the object enters into the light area or thereafter.

14. The method according to claim 1, wherein the illumination structure is broken down into a horizontal and a vertical component.

15. The method according to claim 14, wherein a vertical component is used to calibrate a yaw angle or a horizontal component is used to calibrate a pitch angle.

16. The method according to claim 1, wherein knowledge of a position of the object at the time the object crosses the illumination structure is used to determine an angle difference between an object angle from a position of the at least one headlamp or from a position of the at least one illumination element and an object angle from a position of a camera, this angle difference between the two object angles being taken into account for determining a correction angle for the at least one headlamp.

17. The method according to claim 1, further comprising rating a calibration necessary to bring an actual setting to a target setting and outputting a signal when the necessary calibration is above a limit value.

18. The method according to claim 1, wherein after determining the actual setting and after determining discrepancy between the actual setting and a target setting, the discrepancy is stored in a memory, wherein a multiplicity of ascertainment operations and storage operations for discrepancy data are performed, with editing or averaging of the stored discrepancy data being performed, which is used for the calibration.

19. An apparatus for performing a method according to claim 1, wherein the apparatus comprises:
at least one headlamp or an at least one illumination element,
an image data acquisition unit,
a position recognition unit, and
a control unit, wherein the image data acquisition unit is provided to recognize an object when changing from a dark area to a light area of an illumination structure wherein the position recognition unit is provided in order to ascertain a position of the object upon entry into the light area and to use the position of the object to determine the illumination structure in order to be able to use the actual setting of the at least one headlamp or of the at least one illumination element in comparison with a target setting of the at least one headlamp or of the at least one illumination element to make a correction to an adjustment of the at least one headlamp or of the at least one element.

20. The apparatus according to claim 19, wherein the illumination structure is changed by using the activation, deactivation, or dimming of light-emitting elements of the at least one headlamp or a plurality of headlamps or of a system of headlamps or by using free shaping of a light beam.

21. The apparatus according to claim 19, wherein the adjustment of the headlamp or of the at least one illumination element is made by using at least one control element in order to alter the at least one headlamp or the at least one illumination element by a yaw angle or a pitch angle.

* * * * *